United States Patent
Broding et al.

(10) Patent No.: US 8,885,653 B2
(45) Date of Patent: Nov. 11, 2014

(54) PROTOCOL TRANSLATION

(75) Inventors: Andrew M. Broding, Lynnfield, MA (US); Thomas D. Guinther, IV, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 12/952,267

(22) Filed: Nov. 23, 2010

(65) Prior Publication Data

US 2012/0131220 A1 May 24, 2012

(51) Int. Cl.
*H04L 12/66* (2006.01)
*H04L 12/64* (2006.01)
*H04L 12/46* (2006.01)
*H04L 29/06* (2006.01)

(52) U.S. Cl.
CPC ....... *H04L 12/6418* (2013.01); *H04L 29/06163* (2013.01); *H04L 12/46* (2013.01)
USPC ............ 370/401; 370/465; 370/466; 709/223

(58) Field of Classification Search
CPC .................. H04L 29/06163; H04L 29/06068; H04L 12/66
USPC .......... 370/465, 466, 467, 401; 709/223, 246; 726/12
See application file for complete search history.

(56) References Cited

U.S. PATENT DOCUMENTS

| 701,636 | A | * | 6/1902 | Dong | 192/110 R |
|---|---|---|---|---|---|
| 6,496,835 | B2 | | 12/2002 | Liu et al. | |
| 7,016,360 | B1 | * | 3/2006 | Dong | 370/401 |
| 2003/0145106 | A1 | * | 7/2003 | Brown | 709/238 |
| 2007/0283001 | A1 | * | 12/2007 | Spiess et al. | 709/224 |
| 2009/0215411 | A1 | | 8/2009 | Tucker et al. | |
| 2010/0112983 | A1 | | 5/2010 | Walker et al. | |
| 2010/0250497 | A1 | * | 9/2010 | Redlich et al. | 707/661 |

* cited by examiner

*Primary Examiner* — Ian N Moore
*Assistant Examiner* — Hien Nguyen

(57) ABSTRACT

Methods and systems are provided for protocol translation. One system includes a number of servers configured for protocol translation including logic to receive a number of network packets associated with a particular transaction from a source delivery server. The logic interrogates the number of network packets received to synchronously determine a data format and a protocol of the received network packets and apply a number of rules-based protocols. The rules-based protocols reformat the data format and the protocol of the received network packets according to a data format and a protocol of a destination server, relay the reformatted network packets to the destination server, and provide a response to the source delivery server to permit maintenance of a system state.

14 Claims, 4 Drawing Sheets

PROTOCOL TRANSLATION

BACKGROUND

In protocol translator systems, a source delivery server (e.g., computing device), for example, sends a transaction, comprised of a number of network packets, through a proxy, which delivers the number of network packets to a destination server. The source delivery server may not use the same data format and protocol as the destination server. The transaction maybe undeliverable to the destination server when the delivery source server and the destination server data format and protocol are incompatible. Furthermore, the destination server can restrict the number of source delivery servers that are capable of communicating with it.

Protocol translator systems use "store and forward" translators. That is, the network packets associated with a particular transaction from the source delivery server are deposited on a server configured for protocol translation and then submitted to the destination server via an asynchronous mechanism. Servers configured for protocol translation can be configured to handle transactions synchronously; however, those transactions involve source delivery servers and destination servers that operate with the same data format and protocol. Therefore, network packets associated with a transaction are allowed to pass through a proxy without alteration to the network packets.

DETAILED DESCRIPTION

Figure 1:
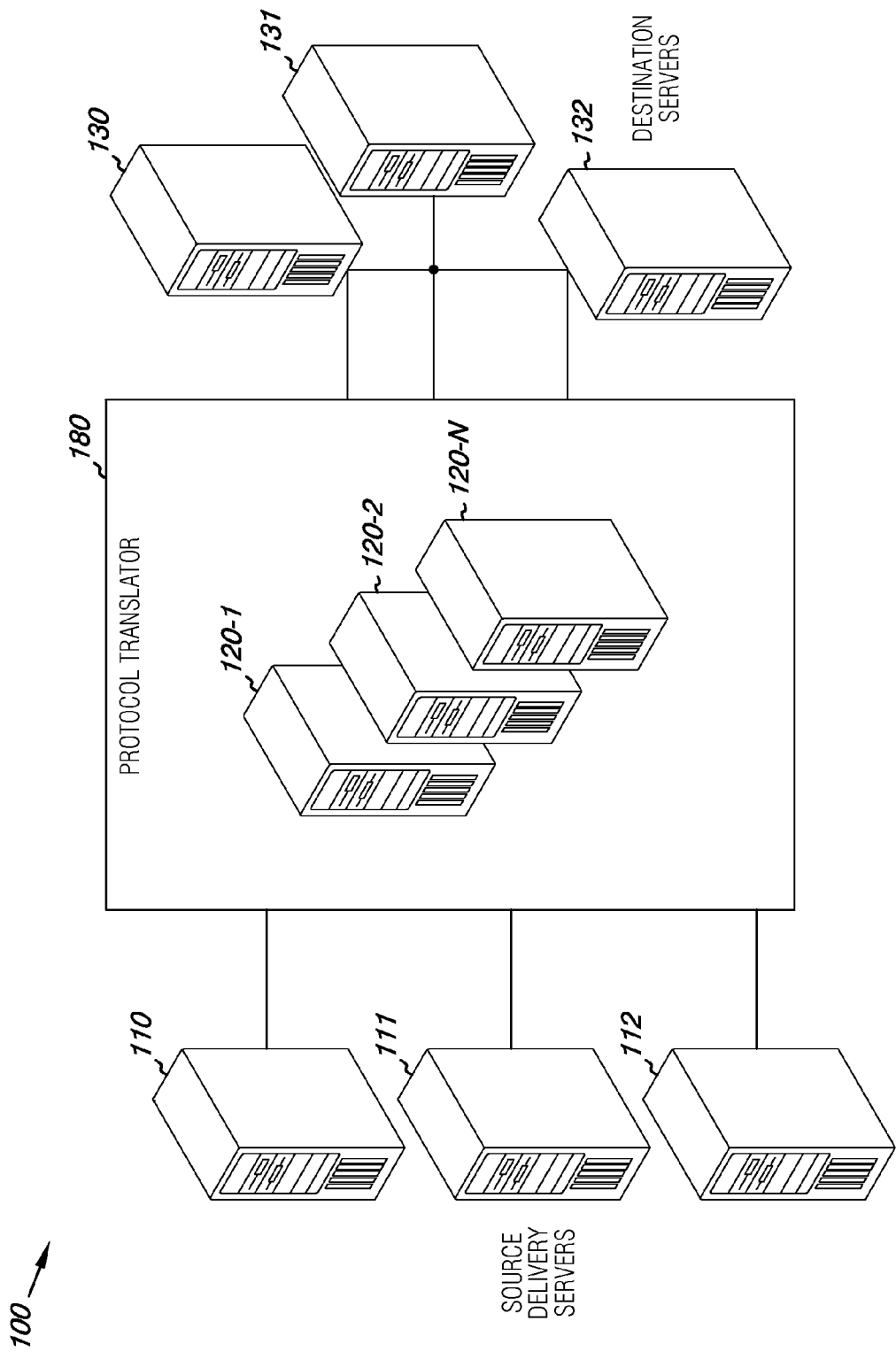
FIG. 1 illustrates an example of a protocol translation system according to the present disclosure.

Systems and methods for implementing a protocol translator device are provided. One system includes a number of servers (i.e., computing devices) configured for protocol translation including logic to receive a number of network packets associated with a particular transaction from a source delivery server. The logic interrogates the number of network packets received to synchronously determine a data format and a protocol of the received network packets and apply a number of rules-based protocols. The rules-based protocols reformat the data format and the protocol of the received network packets according to a data format and a protocol of a destination server, relay the reformatted network packets to the destination server, and provide a response to the source delivery server to permit maintenance of a system state.

Previously, protocol translation systems have used a "store and forward" method that stored the network packets on the local memory storage of the server and later forwarded the transformed network packets to the destination server. Due to the local memory storage, such protocol translation systems suffered from scalability issues. Furthermore, storage of the network packets could result in lost or compromised data before delivery to the destination server.

In the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be used and that process, electrical, and/or structural changes may be made without departing from the scope of the present disclosure.

The figures herein follow a numbering convention in which the first digit corresponds to the drawing figure number and the remaining digits identify an element in the drawing. Similar elements between different figures may be identified by the use of similar digits.

FIG. 1 illustrates an example of a protocol translation system 100 according to the present disclosure. The system 100 can include a number of source delivery servers 110, 111, 112 that use a number of data formats and protocols. Although three source delivery servers are illustrated, examples are not so limited and can include more or fewer source delivery servers. Source delivery servers according to the present disclosure can include a combination of source delivery server types and/or protocols. For example, source delivery server 110 can represent a Simple Mail Transfer Protocol (SMTP) source delivery server, source delivery server 111 can represent a Hypertext Transfer Protocol (HTTP) source delivery server, and source delivery server 112 can represent a cloud computing source delivery server.

The system 100 can further include a protocol translator 180 comprised of a number of servers configured for protocol translation 120-1, 120-2, . . . , 120-N; where 120-N represents any given number of source delivery servers. The servers configured for protocol translation 120-1, 120-2, . . . , 120-N are configured with a number of rules-based protocols. The system 100 includes a number of destination servers 130, 131, 132 that use a number of data formats and protocols. Although three destination servers are illustrated, examples are not so limited and can include more or fewer destination servers. Destination servers according to the present disclosure can include a combination of destination server types and/or protocols. For example, destination server 130 can represent an SMTP destination server, destination server 131 can represent an HTTP destination server, and destination server 132 can represent a cloud computing destination server. The system 100 can include source delivery servers 110, 111, 112 and/or destination servers 130, 131, 132 that use a data format and a protocol that are inalterable by a third party.

The number of servers configured for protocol translation 120-1, 120-2, . . . , 120-N include logic that can receive a number of network packets associated with a particular transaction from a source delivery server 110, 111, 112. The logic can interrogate the number of network packets associated with a particular transaction to facilitate subsequent application of a number of rules-based protocols. Rules-based protocols can be based on criteria specified by a customer and embedded rules limitations and characteristics of at least one of the number of destination servers 130, 131, 132. Criteria and embedded rules limitations and characteristics can include, for example: specifications of one of the number of destination servers 130, 131, 132; data specifics of the number of network packets associated with a particular transaction; and, restrictions of the number of source delivery servers 110, 111, 112 capable of communicating with the number of the destination servers 130, 131, 132. Data specifics can include data format of the incoming network packets, method in which incoming network packets arrived to the number of servers configured for protocol translation 120-1, 120-2, ..., 120-N and the type of incoming network packets.

The logic of the server configured for protocol translation 120-1, 120-2, ..., 120-N can determine a data format and protocol of the received network packets. The logic can reformat the determined data format and the protocol of the received network packets according to a data format and a protocol of a destination server 130, 131, 132. The logic can relay the reformatted network packets to the destination server 130, 131, 132. The logic of the servers configured for protocol translation 120-1, 120-2, ..., 120-N can be configured to relay the reformatted network packets to the number of destination servers 130, 131, 132 of different system types. For example, the destination servers 130, 131, 132 can comprise a cloud computing system, a Microsoft Exchange system or an Integrated Archive Program (IAP) system.

The logic of the servers configured for protocol translation 120-1, 120-2, ..., 120-N can provide a response to the source delivery servers 110, 111, 112 associated with the number of received network packets that were reformatted and relayed to the destination server 130, 131, 132. The servers configured for protocol translation 120-1, 120-2, ..., 120-N can, in some examples, poll a status of the number of servers configured for protocol translation 120-1, 120-2, ..., 120-N, a status of the number of source delivery servers 110, 111, 112 and a status of the number of destination servers 130, 131, 132 in order to load balance between the number of servers configured for protocol translation 120-1, 120-2, ..., 120-N and thereby maintain the synchronous application of the number of defined rules-based protocols. In some examples, a protocol of at least one source delivery server is different than the protocol of at least one destination server. The types of protocols can include, for example, SMTP and HTTP. The logic of the servers configured for protocol translation 120-1, 120-2, ..., 120-N can include a number of applications, for example, a number of start-stop controls and a number of auditing facilities. Start-stop controls can include a standby state of operation and a means to initiate the synchronous reformatting and relaying of the network packets. Auditing facilities can include a tally of the total number of network packets received and a report of the time the server configured for protocol translation has been in operation. The logic of the servers configured for protocol translation 120-1, 120-2, ..., 120-N can be configured to provide the number of responses to a number of source delivery servers 110, 111, 112 of different system types. For example, the source delivery servers 110, 111, 112 can comprise a cloud computing system, a Microsoft Exchange system or an Integrated Archive Program (IAP) system.

One example could have a number of rules-based protocols based on an SMTP source delivery server and a number of destination servers of, for example, varied protocols (e.g., SMTP, HTTP). In such an example a server configured for protocol translation in the protocol translator could be an SMTP translator, capable of reformatting data format and protocol of SMTP transactions to relay the SMTP network packets to any number of destination servers. For example, the SMTP translator could remain in a standby state awaiting a number of network packets associated with a particular transaction sent from the SMTP source delivery server. When initiated, the SMTP translator could interrogate the number of network packets associated with a particular transaction for data provided in both the RFC-821 (SMTP envelope) and the RFC-822 (message) portions of the transaction to verify the format of the data delivered by the source delivery server. Based on the data in the number of network packets associated with the particular transaction the server configured for protocol translation could appropriately map and route the data to be used in a separate SMTP transaction initiated by the SMTP translator with a specified destination server.

Figure 2:
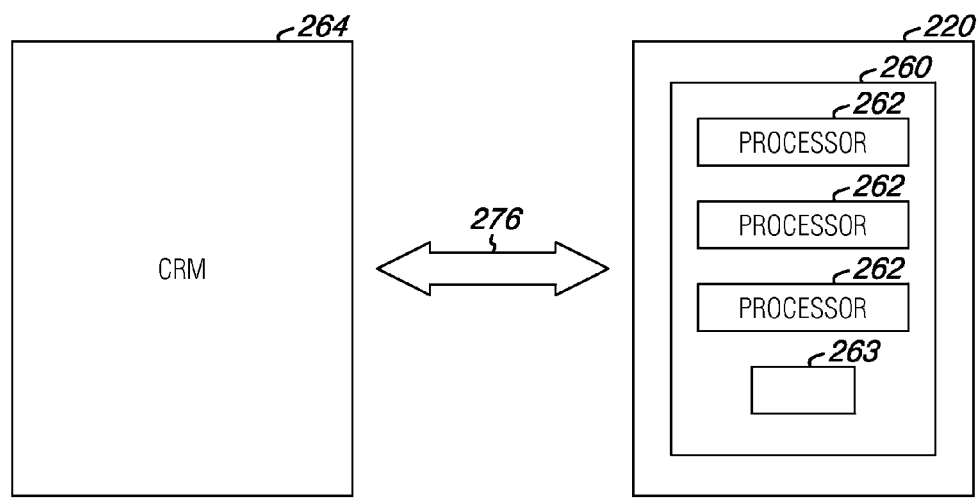
FIG. 2 illustrates a block diagram of an example of a computer readable medium (CRM) in communication with processor resources of a server configured for protocol translation according to the present disclosure.

FIG. 2 illustrates a block diagram of an example of a computer readable medium (CRM) 264 in communication with processor resources 260 in a server configured for protocol translation 220 according to the present disclosure. As used herein, processor resources 260 can include one or a plurality of processors 262 such as in a parallel processing arrangement. A computing device, such as a server configured for protocol translation 220, having processor resources can be in communication with, and/or receive a tangible non-transitory computer readable medium (CRM) 264 storing a set of computer readable and executable instructions (e.g., software) for capturing and/or replaying network traffic, as described herein.

Processor resources can be also be control circuitry that can have a structure that provides a given functionality, and/or execute computer-readable instructions that are stored on an internal or external non-transitory computer-readable medium. Non-transitory computer-readable medium (e.g., computer readable medium 264), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), high definition digital versatile discs (HD DVD), compact discs (CD), and/or a solid state drive (SSD), flash memory, etc., as well as other types of machine-readable media.

The non-transitory computer-readable medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium can have computer-readable instructions stored thereon that are executed by the processing resources (e.g., control circuitry, processor(s)) to provide a particular functionality.

The CRM 264 can be in communication with the processor 260 resources via a communication path 276. The communication path 276 can be local or remote to a machine associated with the processor resources 260. Examples of a local communication path 276 can include an electronic bus internal to a machine such as a computer where the CRM 264 is one of volatile, non-volatile, fixed, and/or removable storage medium in communication with the processor resources 260 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 276 can be such that the CRM 264 is remote from the processor resources 260 such as in the example of a network connection between the CRM 264 and the processor resources 260 (e.g., the communication path 276 can be a network connection). Examples of such a network connection can include a local area network (LAN), a wide area network (WAN), a personal area network (PAN), the Internet, among others. In such examples, the CRM 264 may be associated with a first computing device (e.g., a server) and the processor resources 260 may be associated with a second computing device (e.g., a client). The first and second computers can be in communication via a networked communication path 276. Another example can include the local memory 263 on the server configured for protocol translation 220 that can store the rules-based protocols. The rules-based protocols and applications are executable by processor resources 260.

Figure 3:
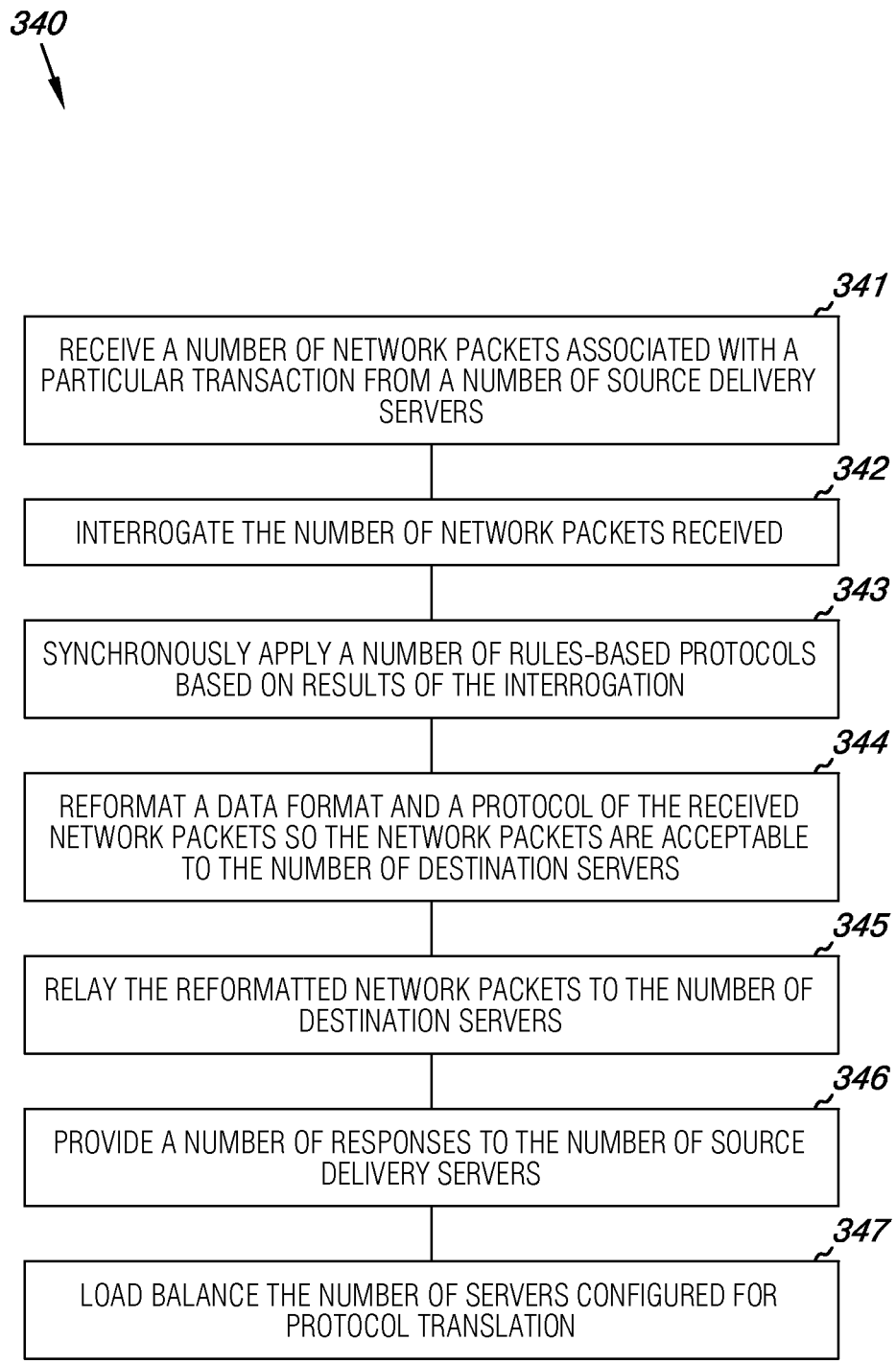
FIG. 3 is a flow chart illustrating an example of a method of protocol translation according to the present disclosure.

FIG. 3 is a flow chart illustrating an example of a method 340 of protocol translation according to one or more examples of the present disclosure. Examples of the present disclosure are not limited to the steps illustrated in FIG. 3. The method includes reception of a number of network packets associated with a particular transaction at step 341, A transaction can include the number of servers configured for protocol translation 120-1, 120-2, . . . , 120-N receiving a number of network packets, the synchronous translation and relay of the number of network packets, reception of a number of responses from the number of destination servers 130, 131, 132, and returning a number of responses to the number of source delivery servers 110, 111, 112. The number of network packets received are interrogated at step 342. Interrogation can include identifying criteria and embedded rules limitations and characteristics of the number of network packets received. For example, interrogation can include using hardware in the form of an application-specific integrated circuit (ASIC) to disassemble the number of network packets to determine the data format of the header and message. Step 343 includes synchronous application of a number of rules-based protocols based on the results of the interrogation in step 352. Synchronous application can entail interrogating the number of network packets and applying the number of rules-based protocols while the connections established between the number of source deliver servers 110, 111, 112 and the number of servers configured for protocol translation 120-1, 120-2, . . . , 120-N and between the number of severs configured for protocol translation 120-1, 120-2, . . . , 120-N and the number of destination servers 130, 131, 132 are maintained open. The method 340 includes reformatting a data format and a protocol of the received network packets at step 344, so the network packets are acceptable to the number of destination servers. Reformatting can include using an ASIC to recompose the header and message to comply with the data format and protocol of the destination server. The protocol translation method at method step 340 includes relay of the reformatted network packets to the number of destination servers at step 345. Relay of reformatted network packets can include transmitting the number of reformatted packets to the number of destination servers.

Step 346 provides a number of responses to the number of source delivery servers. The provision of a number of responses can include reformatting the number of responses into an appropriate protocol result code for the number of source delivery servers to maintain a system state. Appropriate protocol result codes increase outgoing transaction throughput of the source delivery servers over time. Improper result codes could unnecessarily throttle the outgoing transactions or incorrectly error handle individual transactions on the source delivery server. The method 340 includes a load balance of the number of servers configured for protocol translation at step 347. The load balance can include a poll of a status of a number of servers configured for protocol translation, a status of the number of source delivery servers and a status of the number of destination servers.

The method 340 can include application of the number of rules-based protocols without modification of a service of one of the number of source delivery servers, for example, an email router or message transfer agent. Method 340 can include protocol translation when a third party inalterable protocol is used by at least one of the number of source delivery servers that is different than a third party inalterable protocol used by at least one of the number of source delivery servers.

Figure 4:
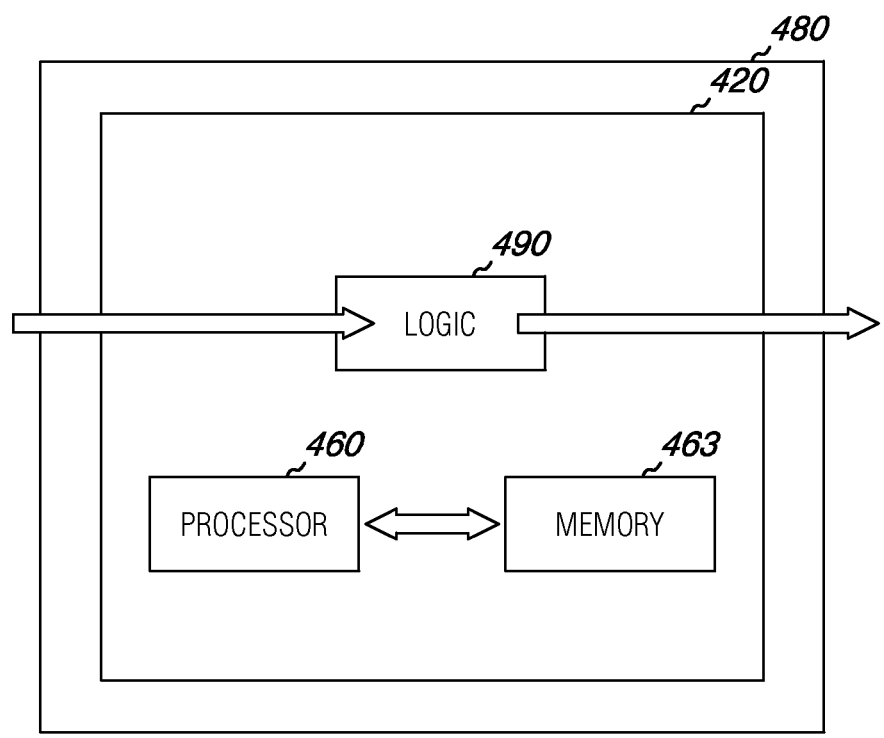
FIG. 4 illustrates a block diagram of an example of a server configured for protocol translation according to the present disclosure.

FIG. 4 illustrates a block diagram of an example of a server configured for protocol translation 420 according to the present disclosure. The protocol translator 480 can include a server configured for protocol translation 420. The server configured for protocol translation can include logic 490, processor resources 460 and local memory 463. As used herein, "logic" implies hardware (e.g., various forms of transistor logic, application specific integrated circuits, ASICs, etc.), as opposed to computer executable instructions (e.g., software, firmware, etc.) stored in memory and executable by a processor. Likewise, total system cost in terms of both fabrication and operation are reduced.

In an example, rules-based protocols and applications can be stored on a computer readable memory (e.g., CRM 264, see FIG. 2) associated with the protocol translator (e.g., protocol translator 220, see FIG. 2) and can be downloaded by local memory (e.g., local memory 263, see FIG. 2) and executable by processor resources (e.g., processor resource 260, see FIG. 2). In some examples, the rules-based protocols can be stored in non-volatile memory in association with a CRM and/or loaded in volatile memory (e.g., RAM) of the protocol translator. In an example, logic operates on received network packets and is not associated with CRM. The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an example," as used herein does not necessarily refer to the same example, although it may.

What is claimed is:

1. A protocol translator system, comprising:
   a number of servers configured for protocol translation including logic to:

receive a number of network packets associated with a particular transaction from a source delivery server;
interrogate the number of received network packets to synchronously:
determine a data format and a protocol of the number of received network packets; and
apply a number of defined rules-based protocols to:
reformat the data format and the protocol of the number of received network packets according to a data format and a protocol of a destination server;
relay the number of reformatted network packets to the destination server; and
provide a response to the source delivery server to permit maintenance of a system state; and
poll a status of the number of servers configured for protocol translation, a status of a number of source delivery servers and a status of a number of destination servers in order to load balance and thereby maintain the synchronous application of the number of defined rules-based protocols;
wherein the protocol of the destination server is different than the protocol of the source delivery server, and
wherein at least one of the source delivery server protocol or the destination server protocol is a Simple Mail Transfer Protocol (SMTP) or a Hypertext Transfer Protocol (HTTP).

2. The protocol translator system of claim 1, wherein the number of rules-based protocols are based on criteria specified by a customer and embedded rules limitations and characteristics of the destination server.

3. The protocol translator system of claim 1, wherein the memory includes logic configured to synchronously interrogate the number of received network packets.

4. A method for protocol translation, comprising:
receiving a number of network packets associated with a particular transaction from a number of source delivery servers;
interrogating the number of received network packets; and
synchronously applying a number of rules-based protocols based on results of the interrogation, wherein synchronous application includes:
reformatting a data format and a protocol of the number of received network packets so the number of received network packets are acceptable to a number of destination servers;
relaying the number of reformatted network packets to the number of destination servers;
providing a number of responses to the number of source delivery servers; and
load balancing a number of servers configured for protocol translation; and
poll a status of the number of servers configured for protocol translation, a status of the number of the source delivery servers and a status of the number of destination servers in order to load balance the number of servers configured for protocol translation,
wherein at least one source delivery server protocol is different than at least one destination server protocol, and
wherein a third party inalterable protocol is used by at least one of the number of source delivery servers that is different than a third party inalterable protocol used by at least one of the number of destination delivery servers.

5. The method of claim 4, wherein the method includes applying the number of rules-based protocols without modifying a service of one of the number of source delivery servers.

6. The method of claim 4, wherein providing the number of responses to the number of source delivery servers includes reformatting the number of responses into a protocol result code for the number of source delivery servers to maintain a system state.

7. The method of claim 4, wherein interrogating the number of received network packets includes synchronously interrogating the number of received network packets.

8. The method of claim 7, wherein reformatting the data format and the protocol of the number of received network packets so the number of received network packets are acceptable to the number of destination servers includes reformatting the data format and the protocol of the number of received network packets to a different data format and protocol of the destination servers.

9. A protocol translator, comprising:
a server configured for protocol translation including a processor in communication with a memory, wherein the memory includes;
a number of rules-based protocols that are executable by the processor; and
logic configured to:
receive a number of network packets from a number of source delivery servers;
interrogate the number of received network packets;
synchronously apply the number of rules-based protocols, including
reformat of a protocol of the number of received network packets to a different protocol acceptable to a number of destination servers;
relay the number of reformatted network packets to the number of destination servers;
provide a number of responses to the number of source delivery servers; and
poll a status of the server configured for protocol translation, a status of the number of the source delivery servers and a status of the number of destination servers in order to load balance the server configured for protocol translation,
wherein the logic includes a number of applications including a number of start-stop controls and a number of auditing facilities.

10. The protocol translator of claim 9, wherein the logic is configured to provide the number of responses to the number of source delivery servers, wherein the number of source delivery servers comprise a cloud computing system.

11. The protocol translator of claim 9, wherein the logic is configured to provide the number of responses to the number of source delivery servers, wherein the number of source delivery servers comprise a Microsoft Exchange system.

12. The protocol translator of claim 9, wherein the logic is configured to provide the number of responses to the number of source delivery servers, wherein the number of source delivery servers comprise an Integrated Archive Program (IAP) system.

13. The protocol translator of claim 9, wherein the memory includes logic configured to:
receive a number of Simple Mail Transfer Protocol (SMTP) network packets from a number of Microsoft Exchange source delivery servers; and
relay the number of reformatted network packets to a number of Integrated Archive Program (IAP) destination servers.

14. The protocol translator of claim 9, wherein the memory includes logic configured to synchronously relay the number of reformatted network packets to the number of destination servers.

* * * * *